Figure 1:
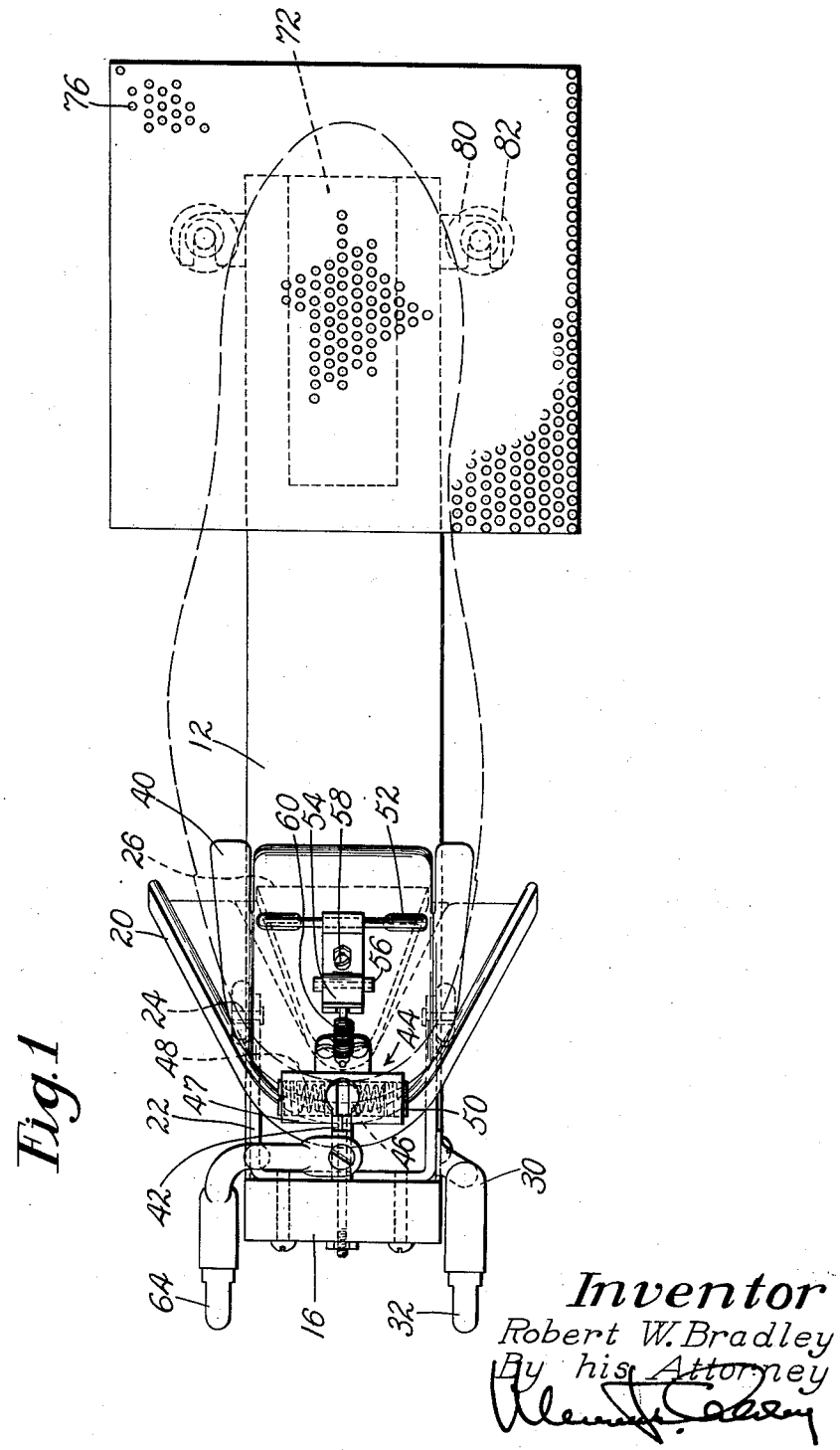

Jan. 12, 1954

R. W. BRADLEY 2,666,130

ELECTRODE SYSTEM

Filed April 2, 1952

3 Sheets-Sheet 3

Inventor
Robert W. Bradley
By his Attorney

Patented Jan. 12, 1954

2,666,130

UNITED STATES PATENT OFFICE 2,666,130

ELECTRODE SYSTEM

Robert W. Bradley, Marblehead, Mass., assignor to United Shoe Machinery Corporation, Flemington, N. J., a corporation of New Jersey Application April 2, 1952, Serial No. 280,149

7 Claims. (Cl. 219—47)

The present invention relates to dielectric heating and more particularly to an electrode system for use therein.

The invention is herein illustrated as applied to an electrode system adapted for the dielectric heating of stiffener material incorporated into the upper materials at the toe ends of shoes but in its broader aspects this invention is applicable generally for heating other types of workpieces.

In the dielectric heating of workpieces, particularly workpieces having irregular or rounded contours, electrodes are frequently designed for operation while disposed a predetermined distance from the surface of a workpiece. Often the purpose of such spacing is to achieve a specific field pattern within the workpiece, and for such purposes the spacing becomes rather critical. Attempts have been made heretofore to provide a predetermined spacing by employing spacer members of insulating material fixedly secured to the electrodes and arranged to engage the surface of the work to hold the work and electrode in separate disposition. Such spacers however, have tended to distort the electric field and, in the case of sensitive work surfaces, may leave a mark at the point of engagement.

Accordingly it is an object of the invention to provide an electrode system for dielectric heating of a workpiece, which system will provide greater ease and facility in adjusting the position of the electrodes to accommodate workpieces of different size and shape and which will not suffer the foregoing disadvantages.

In accordance with the present invention, there is provided an electrode system comprising a pair of relatively movable cooperative electrodes, one of said electrodes carrying a spacer member mounted for movement relative thereto between a gaging position where it extends from a surface of said electrode and a retracted position in which the member is on the other side of said surface out of the electric field, and manually-operated means for extending said spacer member to engage the surface of a workpiece disposed between the electrodes, thereby establishing a predetermined spacing between the workpiece and the electrode, and for retracting the spacer member out of the electric field between the electrodes.

In one illustrative embodiment, the spacer member is retracted by resilient means operating automatically after release of a manually operated liner for extending the spacer, and the electrode is retained in its adjusted position by friction. For example, in the illustrative embodiment, one electrode is connected to its support by a ball-and-socket hinge provided with adjustable friction means.

Where the workpiece to be heated is a shoe, a rather difficult problem is presented in providing gage means to facilitate the disposition of the shoe in operative heating position in the electrodes. Where, for example, the toe end of a shoe is to be heated, it is desirable to provide an abutment for engaging the tip of the toe as the shoe is manually moved into operative position. However, if the tip of the shoe remains in engagement with the abutment during the heating operation, a mark is sometimes left upon the surface of the upper at the point of such engagement. In placing the shoe for heating, it may be retracted slightly from the abutment, but manual retraction of the shoe is inconvenient and time consuming.

In accordance with another feature of the invention, means are provided for automatically retracting the shoe slightly from a gaging abutment after the shoe is released by the operator. In the illustrative embodiment, such retraction is provided by a heel support comprising an array of upstanding resilient members which are flexed slightly toward the toe as the shoe is moved into the electrodes and which, upon release of the shoe by the operator, retract the toe tip slightly from the abutment.

Figure 2:
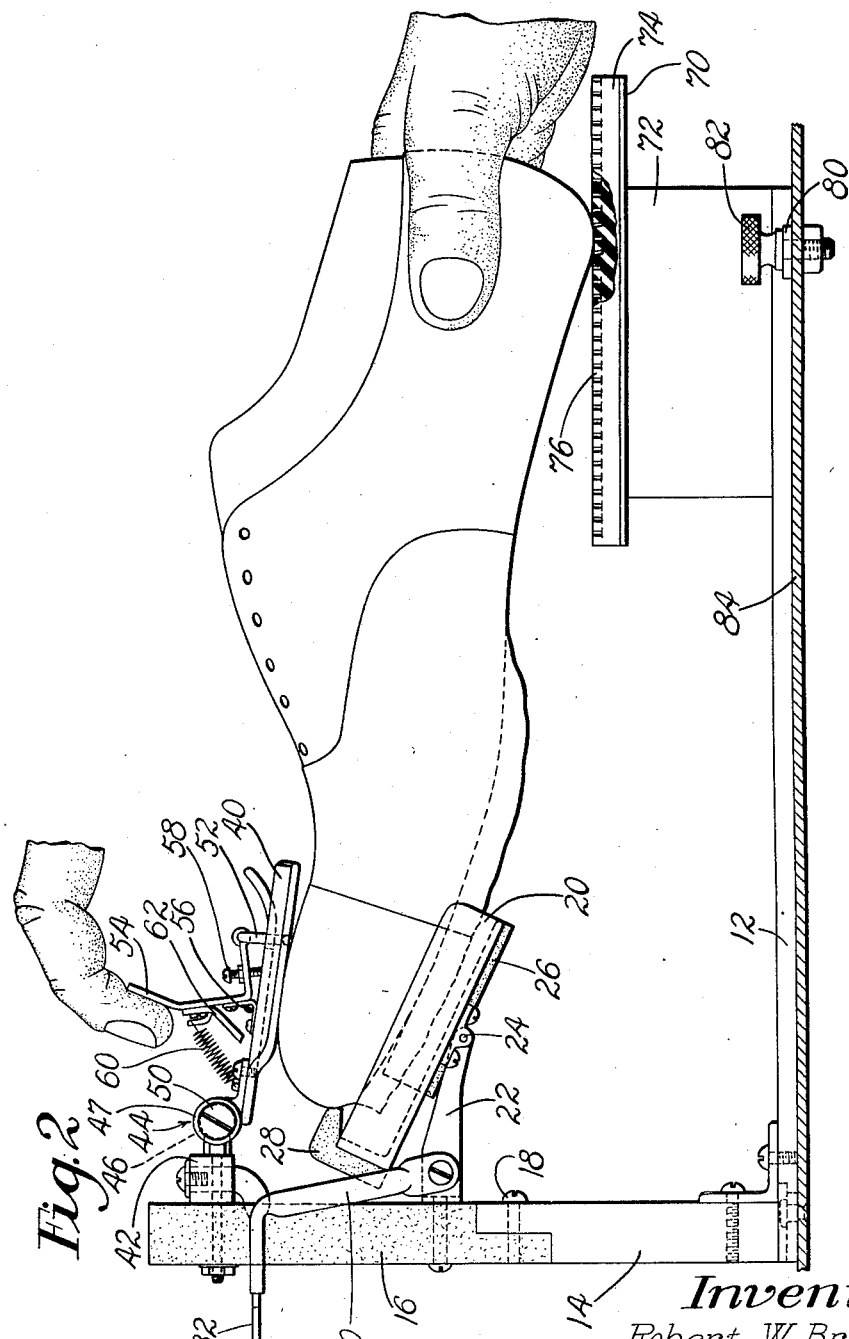
Figure 3:
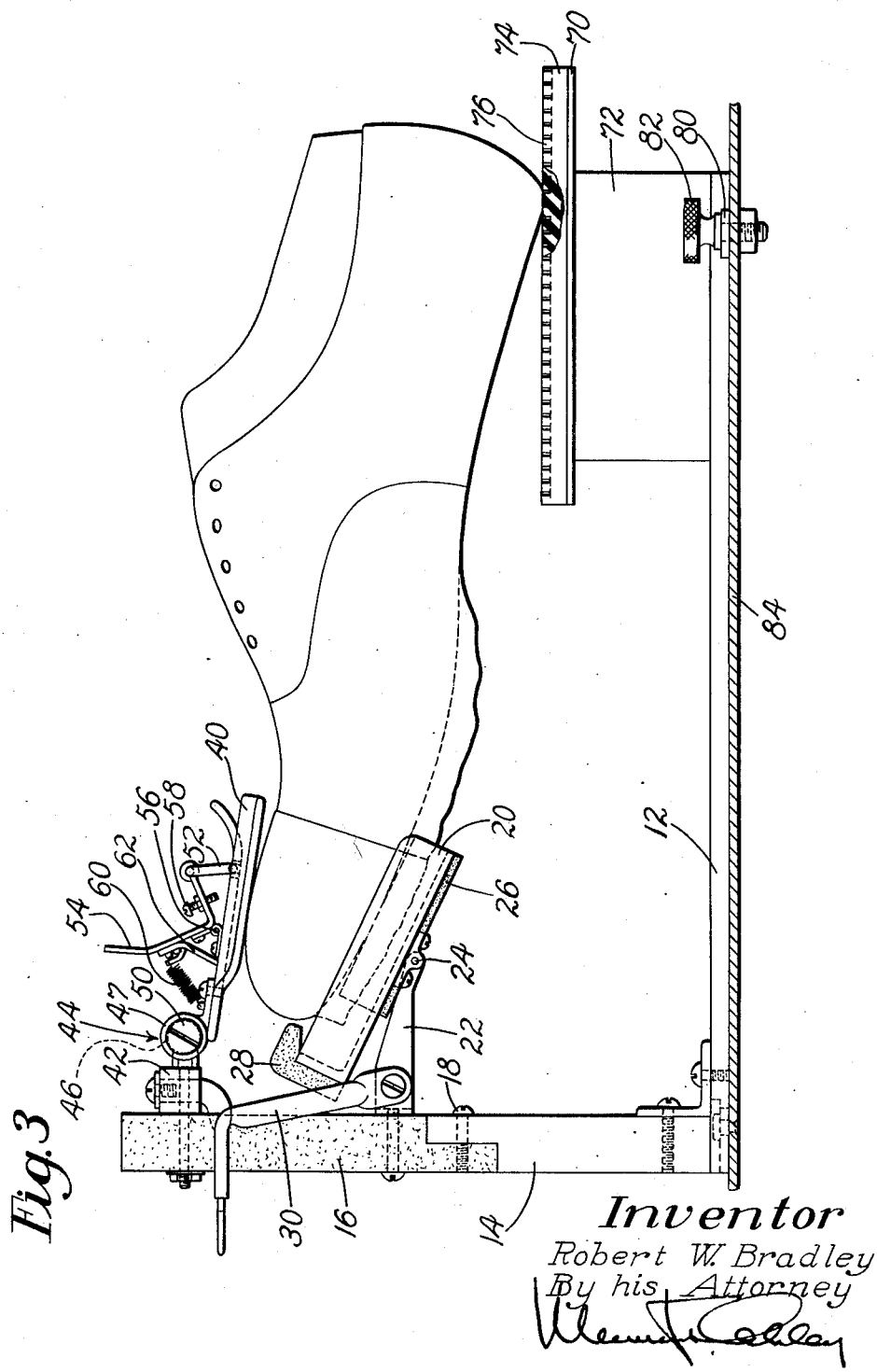

Other objects and features of the invention to be defined in the claims are described in detail in the following specification taken in connection with the accompanying drawings in which, Fig. 1 is a plan view of an electrode system embodying the present invention;

Fig. 2 is a side elevation of the electrode system of Fig. 1 in which a shoe is shown being disposed manually between the electrodes, and a spacer mounted on the upper electrode is shown being extended and pressed against the top of the toe; and Fig. 3 is an elevation similar to Fig. 2 but taken after release of the shoe and the spacer operating means.

The electrode system illustrated herein is designed for use in an apparatus similar to that disclosed in United States Letters Patent No. 2,528,491, issued November 7, 1950, to Robert W. Bradley and Richard C. Wildman. The apparatus of the foregoing patent provides a chassis on which are mounted electrodes for establishing an electrical field in the toe end of a shoe and which supports the components of an oscillator to which the electrodes are connected. The hereinafter described electrode system is adapted to be mounted on a chassis of a similar type for connection to an oscillator.

The electrode system comprises a frame 12 having at one end a pair of upright support sections 14 and 16, respectively, constructed of metallic and insulating material and connected by screws 18. A U-shaped electrode 20 comprising the lower electrode of a pair of toe electrodes is mounted on the support section 16 by a mounting bracket 22. A hinge pin 24 provides for tilting of the electrode to conform with the angle of a shoe bottom presented thereto, a Teflon support block 26 in the center of the electrode engaging the shoe bottom. An abutment 28 also of Teflon is secured to the electrode 20 in a position to engage the tip of a shoe toe when the shoe has been moved into operative position. A conductor 30 has one end connected to the bracket 22 and the other end to a plug 32. The conductor provides a means for connecting the electrode to an oscillator which has its tank circuit connected to a receptacle cooperating with the plug 32.

The upper electrode 40 is mounted on the support 16 by means of a bracket 42 and a hinge 44. The hinge comprises a ball 46 and a socket 47, the ball being connected to the bracket 42 and the socket to the upper electrode. In the socket are springs 48, the inner ends of which bear against the ball and the outer ends against screws 50. These screws may be turned in or out to adjust the friction of the hinge.

Mounted on the electrode 40 are two spacer members 52 disposed in locations spaced transversely of the electrode and carried on and arranged for movement by a manually operated lever 54 connected to the electrode 40 by a hinge 56. The movement in extension of the spacer members 52 is limited by a stop screw 58 to provide an adjustable predetermined separation of the upper electrode from the work surface when the lever 54 is pulled toward the heel end of the shoe (Fig. 2). A spring 60 provides a resilient means for urging the hand lever 54 in a direction to retract the spacer members 52 from the electrical field zone between the electrodes. A stop 62 on the lever 54 is provided to limit the action of the spring 60. The connection of the upper electrode 40 to its support by the ball-and-socket hinge 44 provides for transverse adjustment of the electrode 40 with respect to the shoe surface, this adjustment being gaged by the spacer members 52 in addition to the adjustment in separation gaged by the members.

At the other end of the frame 12 a steel plate 70 is supported upon a block 72. Secured to the plate 70 is a mat 74 of a rubber-like material providing a plurality of resilient upstanding members 76 in the form of cylindrical projections. Also at this end of the frame 12, the block 72 has transversely extending ears 80 which are arranged to cooperate with thumb screws 82 threadedly engaged with the chassis 84 of the dielectric heating apparatus. Accordingly, when it is desired to use this electrode system in the apparatus, the assembly of electrodes and the heel support on the frame 12 may be placed on the chassis with the plugs 32, 64 cooperating with the oscillator receptacle and the ears 80 engaging the thumb screws 82.

In operation, after the electrode system has been plugged into the oscillator chassis, the operator grasps a shoe as in Fig. 2 and moves its toe into engagement with the abutment 28, dragging the heel along the mat 74 for the last short distance of movement. This deforms the upstanding members 76 so that when the operator now releases the shoe the members spring back to retract the toe slightly from the abutment 28 (Fig. 3).

The upper electrode is then brought down upon the toe by pressure upon the lever 54 which extends the spacers 52 and then moves the electrode until the spacers engage the upper surface of the shoe toe. The lever 54 is then released, retracting the spacers 52 from the electrical field. The electrodes and shoe are now in proper relative disposition for heating and the operator may therefore cause the oscillator to supply high-frequency electrical energy to the electrodes for the desired heating cycle.

Having thus described my invention, what I claim as new and desire to secure by Letters Patent of the United States is:

1. In apparatus for dielectric heating, a support, a plate-like electrode, a cooperative electrode mounted on said support, said plate-like electrode being hinged to said support for tilting toward and away from the cooperative electrode and for transverse rocking, a pair of spacer members mounted on said plate-like electrode at transversely spaced locations for extension from and retraction toward a surface thereof, and manually operated means for extending said spacer members simultaneously for engaging a workpiece, aligning the electrode with the work surface, and spacing the electrode a predetermined distance therefrom.

2. In apparatus for dielectric heating, a pair of electrodes adapted to cooperate with the end of a shoe, means for supporting said shoe with one end in the field region of the electrodes, an abutment arranged to be engaged by the tip of said end when said shoe is disposed manually substantially in operating position, and means operative upon manual release of the shoe for retracting the tip from engagement with the abutment.

3. In apparatus for dielectric heating, a pair of electrodes adapted to cooperate with the end of a shoe, means for supporting one end of a shoe in the field region of said electrodes, an abutment arranged to be engaged by the tip of said end when the shoe is substantially properly positioned lengthwise, and a flat support for the other end of the shoe, said support comprising an array of resilient upstanding members arranged to engage the other end of the shoe and be deformed while the one end of the shoe is manually moved for engagement with the abutment, whereby upon manual release, the tip is slightly retracted from the abutment.

4. In apparatus for dielectric heating, first and second electrodes mounted for relative movement toward and away from each other and having opposable work surfaces, and a spacer member supported on one of said electrodes for movement relative thereto in a predetermined path between a gaging position in which said member lies at least in part in the space between the electrodes for gaging the spacing between a work piece and said one electrode and a retracted position in which said member is disposed entirely on the other side of the work surface of said one electrode.

5. In apparatus for dielectric heating, first and second electrodes mounted for relative movement toward and away from each other and having opposable work surfaces, a spacer member supported on one of said electrodes for movement relative thereto in a predetermined path between a gaging position in which said member lies at least in part in the space between the electrodes for gaging the spacing between a workpiece and the said one electrode and a retracted position in which said member is disposed outside the field between said electrodes, and an adjustable stop for preventing movement in extension of said spacer member beyond a predetermined variable distance.

6. In apparatus for dielectric heating, first and second electrodes mounted for relative movement toward and away from each other and having opposable work surfaces, a spacer member supported on one of said electrodes for movement relative thereto in a predetermined path between a gaging position in which said member lies at least in part in the space between the electrodes for gaging the spacing between a workpiece and said one electrode and a retracted position, and a lever pivotally connecting said spacer member and said one electrode and operable to impart relative movement therebetween, said lever being arranged to move said one electrode away from the other electrode upon support of said spacer member against movement toward said other electrode during relative movement of said member into gaging position.

7. In apparatus for dielectric heating, first and second electrodes having opposable work surfaces, means for supporting said electrodes for relative movement toward and away from each other, adjustable friction means providing a variable restraint to such relative movement, a spacer member supported on one of said electrodes for movement relative thereto in a predetermined path between a gaging position in which said member lies at least in part in the space between the electrodes for gaging the spacing between a workpiece and said one electrode and a retracted position, and a common member arranged both to move said one electrode relative to said other electrode and to impart relative movement between said one electrode and said member.

ROBERT W. BRADLEY.

References Cited in the file of this patent
UNITED STATES PATENTS

| Number | Name | Date |
| --- | --- | --- |
| 2,222,615 | Hart, Jr. | Nov. 26, 1940 |
| 2,275,430 | Hart, Jr., et al. | Mar. 10, 1942 |
| 2,304,983 | Winkley et al. | Dec. 15, 1942 |
| 2,450,956 | Hart | Oct. 12, 1948 |
| 2,528,491 | Bradley et al. | Nov. 7, 1950 |
| 2,587,034 | Dobbs et al. | Feb. 26, 1952 |